US012768373B2

(12) United States Patent
Nagao

(10) Patent No.: US 12,768,373 B2
(45) Date of Patent: Oct. 20, 2026

(54) CYLINDER DEVICE

(71) Applicant: KOSMEK LTD., Kobe (JP)

(72) Inventor: Tetsuya Nagao, Kobe (JP)

(73) Assignee: KOSMEK LTD. (JP)

( * ) Notice: Subject to any disclaimer, the term of this patent is extended or adjusted under 35 U.S.C. 154(b) by 0 days.

(21) Appl. No.: 19/112,484

(22) PCT Filed: Jul. 25, 2023

(86) PCT No.: PCT/JP2023/027187
§ 371 (c)(1),
(2) Date: Mar. 17, 2025

(87) PCT Pub. No.: WO2024/070173
PCT Pub. Date: Apr. 4, 2024

(65) Prior Publication Data
US 2026/0098549 A1 Apr. 9, 2026

(30) Foreign Application Priority Data
Sep. 30, 2022 (JP) ................................ 2022-157558

(51) Int. Cl.
*F15B 15/14* (2006.01)
*B23Q 3/08* (2006.01)
(Continued)

(52) U.S. Cl.
CPC .......... *F15B 15/1461* (2013.01); *B23Q 3/082* (2013.01); *F15B 15/149* (2013.01); *F15B 15/2838* (2013.01); *F16J 15/008* (2013.01)

(58) Field of Classification Search
CPC .............. F15B 15/1461; F15B 15/1471; F15B 15/149; F15B 15/204; F15B 2015/268;
(Continued)

(56) References Cited

U.S. PATENT DOCUMENTS 6,598,713 B1 * 7/2003 Kawakami .............. B25B 5/065
269/309
7,325,798 B2 * 2/2008 Yonezawa ............ B23Q 1/0081
269/309
(Continued)

FOREIGN PATENT DOCUMENTS

JP 2019215074 9/2012
JP 2014129864 7/2014
(Continued)

OTHER PUBLICATIONS

International Search Report dated Sep. 26, 2023 issued in connection with International Application No. PCT/JP2023/027187.
(Continued)

*Primary Examiner* — Michael Leslie
(74) *Attorney, Agent, or Firm* — Merek, Blackmon & Voorhees, LLC

(57) ABSTRACT

Provided is a cylinder device provided with a mechanism for detecting, in three stages, the position of an output member by using the outer periphery of a piston rod of the output member, and the inner wall of a housing. A housing (2) is provided with an A passage (Ap) for supplying compressed gas, and a B passage (Bp) for discharge to the atmosphere. A piston rod (3) is provided with a projection (12*a*) that pulls and pushes down the seal member (11) together with an annular valve member (10). The hollow inner wall inside the housing is provided with a sliding region (13) having an inner diameter such that a seal member (11*a*) makes contact therewith to effectively enable the seal function, a loose insertion region (14) having a large inner diameter such that the sealing function of the seal member (11*a*) does not work at all and a valve member region (18) which has a large inner diameter such that the annular valve member (10) can move up/down, and which stores the annular valve member (10)
(Continued)

while the upper side is surrounded by a ring surface (2*d*), the valve member region communicating with the B passage (Bp).

4 Claims, 8 Drawing Sheets

(51) Int. Cl.
*F15B 15/28* (2006.01)
*F16J 15/00* (2006.01)

(58) Field of Classification Search
CPC ..... F15B 15/28; F15B 15/2807; F16J 15/008; F16J 15/164; B23Q 3/06; B23Q 3/08; B23Q 3/082
See application file for complete search history.

(56) References Cited

U.S. PATENT DOCUMENTS

| | | | | |
|---|---|---|---|---|
| 9,242,324 | B2 * | 1/2016 | Kawakami | B23Q 3/082 |
| 10,316,870 | B2 * | 6/2019 | Kitaura | F15B 15/2807 |
| 10,508,665 | B2 * | 12/2019 | Kojima | B23Q 3/082 |
| 11,255,357 | B2 * | 2/2022 | Yoshimi | F15B 15/28 |

FOREIGN PATENT DOCUMENTS

| | | |
|---|---|---|
| JP | 2014240117 | 12/2014 |
| JP | 2012166276 | 12/2019 |

OTHER PUBLICATIONS

Written Opinion dated Sep. 26, 2023 issued in connection with International Application No. PCT/JP2023/027187.

* cited by examiner

CYLINDER DEVICE

FIELD OF THE INVENTION

The present invention relates to a cylinder device, and in particular, relates to a cylinder applied to a cylinder device or the like for fixing an object to be clamped.

The cylinder device shifts from an unclamped state to a clamped state by an up/down movement of an output member. A mechanism for detecting a position of a piston portion in each state is disclosed in Patent Document 1. Patent Document 1 discloses a cylinder having an output member that is moved up/down by a pressure fluid in a housing. A first valve chamber is provided between the lower wall of the housing and the output member. Further, a second valve chamber is provided in the piston portion in a hollowed shape, and is opened to the first valve chamber side. A valve rod protrudes from the lower wall of the housing and is inserted into the second valve chamber. In addition to a flow path of the pressure fluid that drives the output member, the first valve chamber, the valve rod, and the second valve chamber are used to arrange one system of compressed gas for position detection. The position of the output member is detected depending on whether the pressure of the system when the compressed gas is sent to the system is in a high state, a low state, or an intermediate state.

PRIOR ART

Patent Literature

Patent literature 1: Japanese Patent Laid Open Publication No. 2019-215074

DISCLOSURE OF THE INVENTION

Problems to be Solved by the Invention

According to the mechanism for detecting the position of the output member of Patent Document 1, the second valve chamber is formed by hollowing the output member, and a valve rod is protruded from the lower wall of the housing and inserted in the hollow. Therefore, it is difficult to apply to the small-sized cylinder device.

The purpose of the present invention is to provide a cylinder device provided with a mechanism for detecting a position of an output member in three stages using an outer periphery of a piston rod of an output member and an inner wall of a housing.

Means to Solve the Problem

The present invention relates to a cylinder device having a piston that moves up/down in a housing with a pressure fluid, and is characterized by the following configuration. That is, the cylinder device of the present invention includes a piston rod fixed to the piston, a seal member attached to a seal groove on an outer peripheral wall of the piston rod, and a hollow inner wall in the housing in which the piston rod moves up/down. Further, the housing has a supply passage for supplying compressed gas inside the hollow inner wall, a discharge passage for discharging the compressed gas supplied inside the hollow inner wall to atmosphere, and a pressure loss passage for allowing the compressed gas supplied inside the hollow inner wall to pass through with a pressure loss larger than that of the supply passage and the discharge passage and communicate to the discharge passage. The hollow inner wall in the housing has sliding regions each having an inner diameter such that the seal member makes contact therewith to effectively enable a seal function, and loose insertion regions each having a large inner diameter such that the seal function of the seal member is disabled, i.e., does not work at all in that the seal member does not perform a seal function, wherein one loose insertion region is sandwiched between two sliding regions from the top and the bottom, and wherein one loose insertion region is sandwiched between two sliding regions from the top and the bottom, and the two sliding regions are provided so as to be sandwiched between other two loose insertion regions from the top and the below. Furthermore, each of the supply passage, the discharge passage, and the pressure loss passage is connected to one of the separate loose insertion regions, and the loose insertion region to which the supply passage is connected is vertically (up and down) adjacent to another loose insertion region to which the supply passage is connected.

In addition, in the present invention, in a cylinder device having a piston that moves up/down by a pressure fluid in a housing, the cylinder device includes a piston rod fixed to the piston, a seal member attached to each of seal grooves spaced above and below on the outer peripheral wall of the piston rod, and a hollow inner wall in the housing in which the piston rod moves up/down. The housing includes a supply passage for supplying compressed gas inside the hollow inner wall, a discharge passage for discharging the compressed gas supplied inside the hollow inner wall to the atmosphere, and a pressure loss passage for allowing the compressed gas supplied inside the hollow inner wall to pass through with a pressure loss larger than that of the supply passage and the discharge passage, and for communicating with the discharge passage. The hollow inner wall in the housing is provided with sliding regions each having an inner diameter such that the seal member makes contact therewith to effectively enable a seal function, and loose insertion regions each having a large inner diameter so that the seal function of the seal member is disabled, i.e., does not work at all in that the seal member does not perform a seal function, wherein one loose insertion region is sandwiched by two sliding regions above and below, and other loose insertion regions are provided above and below the two sliding regions, respectively. Each of the supply passage, the discharge passage, and the pressure loss passage is connected to one of the separate loose insertion regions, and the loose insertion region to which the supply passage is connected is vertically (up and down) adjacent to another loose insertion region to which the supply passage is connected. In a process in which the piston rod is moved up/down, the upper and lower seal members are attached so as to be simultaneously positioned at the positions of the upper and lower sliding regions, respectively.

In addition, in the present invention, in a cylinder device having a piston that moves up/down by a pressure fluid in a housing, the cylinder device includes a piston rod fixed to the piston, a seal member attached to each of seal grooves spaced above and below on the outer peripheral wall of the piston rod, and a hollow inner wall in the housing in which the piston rod moves up/down. The housing includes a supply passage for supplying compressed gas inside the hollow inner wall, a discharge passage for discharging the compressed gas supplied inside the hollow inner wall to the atmosphere, and a pressure loss passage for allowing the compressed gas supplied inside the hollow inner wall to pass through with a pressure loss larger than that of the supply passage and the discharge passage, and for communicating with the discharge passage. The hollow inner wall in the housing is provided with sliding regions each having an inner diameter such that the seal member makes contact therewith to effectively enable the seal function, and loose insertion regions each having a large inner diameter so that the seal function of the seal member is disabled, i.e., does not work at all in that the seal member does not perform a seal function, wherein one loose insertion region is sandwiched by two sliding regions above and below, and the other loose insertion regions are provided above and below the two sliding regions, respectively. Each of the supply passage, the discharge passage, and the pressure loss passage is connected to one of the separate loose insertion regions, and the loose insertion region to which the supply passage is connected is vertically (up and down) adjacent to another loose insertion region to which the supply passage is connected. In a process in which the piston rod is moved up/down, when one of the seal members is positioned at the position of either the upper or lower sliding region, the other seal member is attached so as to be positioned at the position of either the upper or lower loose insertion region.

In addition, in the present invention, in a cylinder device having a piston that moves up/down by a pressure fluid in a housing, the cylinder device includes a piston rod fixed to the piston, seal members attached to seal grooves on an outer peripheral wall of the piston rod, a hollow inner wall in the housing in which the piston rod moves up/down, and an annular valve member externally inserted into the piston rod. The housing is provided with a supply passage for supplying compressed gas inside the hollow inner wall, and a discharge passage for discharging the compressed gas supplied inside the hollow inner wall to the atmosphere. The piston rod is provided with a projection that pushes down the annular valve member on the lower side of the seal groove. In the hollow inner wall in the housing, a sliding region having an inner diameter such that the seal member makes contact therewith to effectively enable a seal function, a loose insertion region having a large inner diameter such that the seal function of the seal member is disabled, i.e., does not work at all in that the seal member does not perform a seal function, and a valve member region having a large inner diameter that allows the annular valve member to move up/down, surrounding the upper side with the ring surface to accommodate the annular valve member, and communicating with the discharge passage, are continuously vertically provided. In a process in which the piston rod is moved up/down, the seal members are provided to the position of the upper-side sliding region and the position of the loose insertion region, and the projection is provided to the position where the projection pushes down the annular valve member.

Effects of Invention

According to the present invention, since the position of the output member can be detected in three stages by using the outer periphery of the piston rod and the inner wall of the housing, the cylinder device can be miniaturized.

BRIEF DESCRIPTION OF THE DRAWINGS

FIGS. 1A to 1D show a cylinder device in Example 1 of the present invention, wherein FIG. 1A is a cross-sectional view of an unclamped state, FIG. 1B is a cross-sectional view of a housing, FIG. 1C is a cross-sectional view of an output member 6, and FIG. 1D is a perspective view of a clamp rod.

FIGS. 2A and 2B show the cylinder device in Example 1, wherein FIG. 2A is a cross-sectional view of a clamped state, and FIG. 2B is an enlarged view of an annular valve member.

FIGS. 4A to 4C show Example 2 of the present invention, wherein FIG. 4A shows an unclamped state, FIG. 4B is a clamped state, and FIG. 4C shows a cross-sectional view of the clamped state, respectively.

FIGS. 5A to 5C show Example 3 of the present invention, wherein FIG. 5A shows an unclamped state, FIG. 5B is a clamped state, and FIG. 5C shows a cross-sectional view of the clamped state, respectively.

FIGS. 6A to 6C show Example 4 of the present invention, wherein FIG. 6A shows an unclamped state, FIG. 6B is a clamped state, and FIG. 6C shows a cross-sectional view of the clamped state, respectively.

FIGS. 7A to 7C show Example 5 of the present invention, wherein FIG. 7A shows an unclamped state, FIG. 7B is a clamped state, and FIG. 7C shows a cross-sectional view of the clamped state, respectively.

FIGS. 8A to 8C show Example 6 of the present invention, wherein FIG. 8A shows an unclamped state, FIG. 8B is a clamped state, and FIG. 8C shows a cross-sectional view of the clamped state, respectively.

PREFERRED EMBODIMENT OF THE INVENTION

Figure 1A:
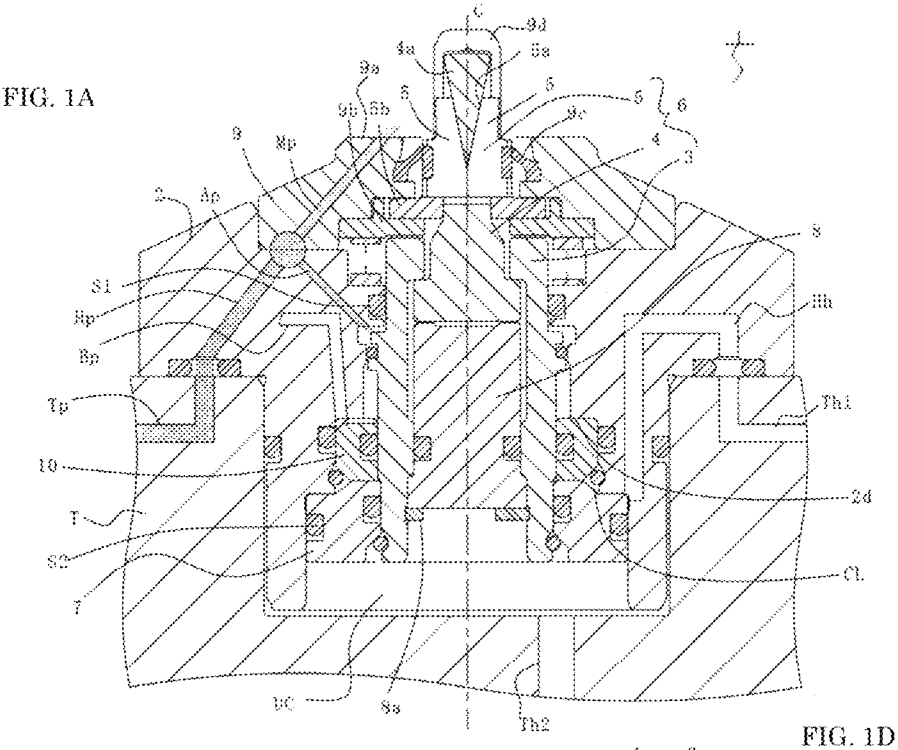

An overall structure of a cylinder device will be described. The cylinder device includes a housing and an output member. The output member includes a piston rod that moves up/down inside a hollow inner wall in the housing, a clamp rod that is driven by the piston rod, and a gripping member. A direction in which the piston rod moves up/down is called an axis c direction. "Up" or "down" does not indicate a gravity direction, and a direction in which the output member is pulled into the housing in the axis c direction is called "down" and a direction in which it is ejected from the housing is called "up". In addition, the piston, piston rod, and clamp rod together are called the output member.

The cylinder device of the present invention utilizes compressed gas to detect the position of the output member in three stages. The compressed gas is supplied to the cylinder device in a system different from a pressure fluid that moves up/down the output member. As the compressed gas, air, nitrogen gas, and the like can be used. The housing is provided with a passage for supplying the compressed gas and a passage for discharging the compressed gas to the atmosphere. The two passages are called a supply passage and a discharge passage, respectively. While the supply passage and the discharge passage are connected through the hollow in the housing and the piston rod, the gap between the supply passage and the discharge passage can be closed, mid-closed, or open depending on the upper and lower positions of the piston rod. The detection of the upper and lower positions of the piston rod is performed by measuring the pressure of the passage on the side to which the compressed gas is supplied.

When the supply passage and the discharge passage are in the closed state, there is no leakage of the compressed gas, so that the pressure is measured "high pressure". When the supply passage and the discharge passage are in the mid-closed state, the compressed gas leaks to the medium level, so that the pressure is measured "medium pressure". When the supply passage and the discharge passage are in the open state, the compressed gas is opened to the atmosphere, so that the pressure is measured "low-pressure". Besides, regarding the pressure detected by the pressure sensor, if the pressure is equal to or lower than a first threshold value previously set in the pressure sensor, it can be defined as "low pressure," if the pressure is equal to or higher than a second threshold value that is higher than the first threshold value, it can be defined as "high pressure," and if the pressure is between the first threshold value and the second threshold value, it can be defined as "medium pressure". The first threshold value and the second threshold value may be set to one pressure sensor. Two pressure sensors may be provided in one passage. When two pressure sensors are provided, a first threshold value may be set to one pressure sensor and a second threshold value may be set to the other pressure sensor. When the pressure sensor acquires pressure values as numerical values, the first threshold value and the second threshold value may be set in the comparator to classify the output of the pressure sensor into "high pressure", "medium pressure", and "low pressure".

An outer peripheral wall structure of the piston rod and a hollow inner wall structure of the housing allow the state to change between closed, mid-closed and open. Also, as necessary, an annular valve member is used. The annular valve member is a member that moves between the hollow inner wall of the housing and the outer peripheral wall of the piston rod, separately from the piston. These combinations are selected based on what pressures can be detected when the piston rod is in a raised position, in an intermediate position, and in a lowered position.

That is, at the time of the raised position, it is necessary to be able to detect either "high pressure", "medium pressure", or "low pressure". The same applies for the time of the intermediate position and the time of lowered position, and when considering the permutation combination, there are 6 patterns. The 6 patterns will be described in Examples 1 to 6.

In addition, the outer peripheral wall of the piston rod and the hollow inner wall of the housing are formed by combining several sections and regions in a vertical direction.

First, the outer peripheral wall of the piston rod has substantially the same diameter, but the limited range of the outer peripheral wall of the piston rod has the following sections:

1) an S-seal section with a seal member attached around one circumference (hereinafter the reference numeral "11" will be used in each example), wherein an O-ring and a packing are used as the seal member,
2) a push section that pushes down the annular valve member when the piston rod is lowered (same as above reference numeral "12").

One or two of the S-seal sections 11 or one of the S-seal sections 11 and the push section 12 are combined to be mounted on the outer peripheral wall of the piston rod.

Assuming that one of passages A and B is a supply passage to which compressed gas is supplied and the other is a discharge passage open to the atmosphere, the regions of the hollow inner wall of the housing are as follows:

1) a sliding region (hereinafter, the reference numeral "13" will be used commonly in each example) having an inner diameter such that the seal member of the piston rod makes contact therewith to effectively enable the seal function, here, there is a gap between the sliding region and the outer peripheral wall of the piston rod in a range where the seal member is not in contact therewith,
2) a loose insertion region (the same above, the reference numeral "14") having a large inner diameter such that the sealing function of the seal member of the piston rod is disabled, i.e., does not work at all in that the seal member does not perform a seal function,
3) an A passage connection region (the same above, the reference numeral "15") where the A passage is connected to the loose insertion region,
4) a B passage connection region (the same above, the reference numeral "16") where the B passage is connected to the loose insertion region,
5) a pressure loss passage connection region (the same above, the reference numeral "17") where a pressure loss passage is connected to the loose insertion region, wherein the loose insertion passage communicates with the B passage or the A passage through the pressure loss passage, here, the pressure loss passage is a passage having a larger pressure loss than any of the A passage and the B passage, specifically, the pore size can be narrowed by reducing the pore diameter or inserting obstacles.
6) a valve member region having a large inner diameter and capable of accommodating the annular valve member by surrounding the upper side with a ring surface (the same above, the reference numeral "18"), here, the annular valve member can move up/down in the valve member region, the valve member region communicates with the B passage.

These are selectively combined and mounted on the hollow inner wall of the housing. However, the loose insertion region is mounted as a part of the A passage connection region, the B passage connection region, and the pressure loss passage connection region.

Further, the annular valve member, which is applied as necessary, is provided with a groove on its upper surface. When the grooved upper surface of the annular valve member comes into surface contact with a ring surface on the upper side of the valve member region, the ring surface and the groove form a pressure loss passage, which communicates with the B passage.

In the following examples, the A passage is a supply passage, and the B passage is a discharge passage.

Example 1

FIGS. 1A to 1C, 2A and 2B and 3 show a cylinder device 1 according to Example 1.

The cylinder device 1 is a cylinder device that is "high pressure" when the output member is in the raised position, "medium pressure" when the output member is in the intermediate position, and "low pressure" when the output member is in the Lowered Position.

Figure 1B:
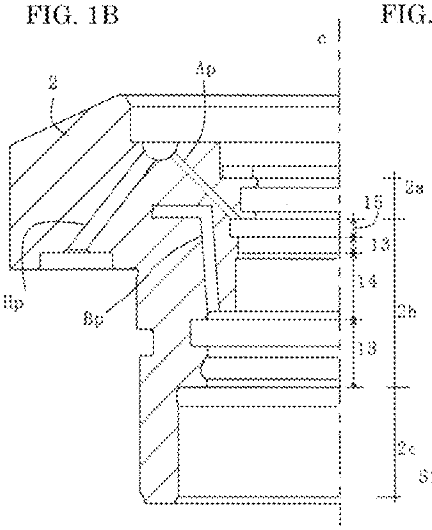

FIG. 1B shows a housing 2 alone. The housing 2 is fixed to a table T as a fixing table. The housing 2 has a hollow cylindrical shape, and the hollow inner wall includes a collar portion 2*a*, a pressure detection portion 2*b*, and a cylinder portion 2*c* from the top.

Figure 1C:
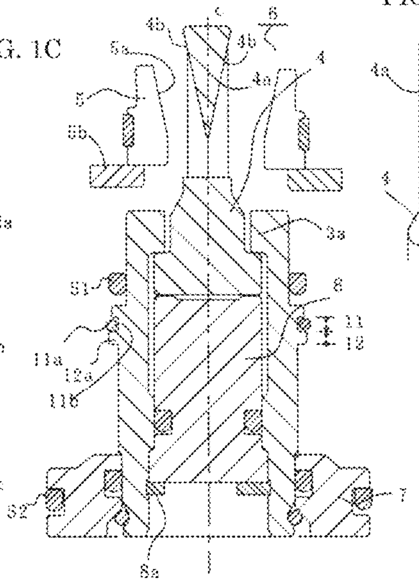

FIG. 1C shows an output member 6 alone. The output member 6 includes a piston 7, a piston rod 3, a clamp rod 4, and a pair of slider pieces 5 for gripping a workpiece. The piston rod 3 has a cylindrical shape, and the piston 7 is fixed to the outer peripheral surface of the lower end of piston rod 3. The piston 7 is a portion inserted into the cylinder portion 2*c*. The clamp rod 4 is inserted into the hollow inner wall of the piston rod 3 from the bottom side and is stopped at a flange portion 3*a* provided at the inner edge of the upper end. A spacer 8 is inserted into the hollow portion from the bottom of the piston rod 3, and is fixed by a stop ring 8*a* so as not to fall out of the hollow portion. An S-seal section 11 is provided on the outer periphery of the piston rod 3. An O-ring is attached to a ring groove 11*b* as a seal member 11*a* in the S-seal section 11. The seal member 11*a* seals the outer periphery of the piston rod 3 over one circumference.

Further, a projection 12*a* is provided around the outer periphery below the S-seal section 11. The projection 12*a* is a projection that pushes down the annular valve member 10, and a region in which the projection 12*a* is provided is a push section 12. The regions of the piston rod 3 other than these two regions have approximately the same diameter, which is generally smaller than the outer diameter of the seal member 11*a*.

Figure 1D:
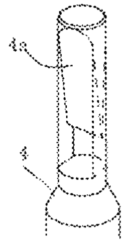

A perspective view of an end portion of the clamp rod 4 is shown in FIG. 1D. A cam portion 4*a* is provided at the end portion of the clamp rod 4. The cam portion 4*a* is provided with two inclined surfaces 4*b* on either side of the axis c, the inclined surfaces 4*b* getting closer to the axis c as the lower the inclined surfaces 4*b* go downward. A large number of seal members are arranged between the piston 7, the piston rod 3, and the spacer 8 so as to fill gaps between these members.

Returning to FIG. 1A, the collar portion 2*a* of the housing 2 supports the output member 6 in the direction of the axis c so that it can move up/down. The cylinder portion 2*c* accommodates the piston 7 that can be moved up/down.

O-rings S1 and S2 are respectively arranged above and below the output member 6, and between the output member 6 and the housing 2 to prevent compressed leakage. The pressure detection portion 2*b* continuously includes, in order from the top, an A passage connection region 15 communicating with the A passage Ap of the housing 2, a sliding region 13 having an inner diameter that can be sealed by the seal member 11*a* of the S-seal section 11, a loose insertion region 14 having a large inner diameter that cannot be sealed by the seal member 11*a* of the S-seal section 11, and a valve member region 18 having an inner diameter larger than the loose insertion region and through which the annular valve member 10 can slide. The ceiling surface on the upper side of the valve member region 18 is a ring surface 2*d*.

Figure 2A:
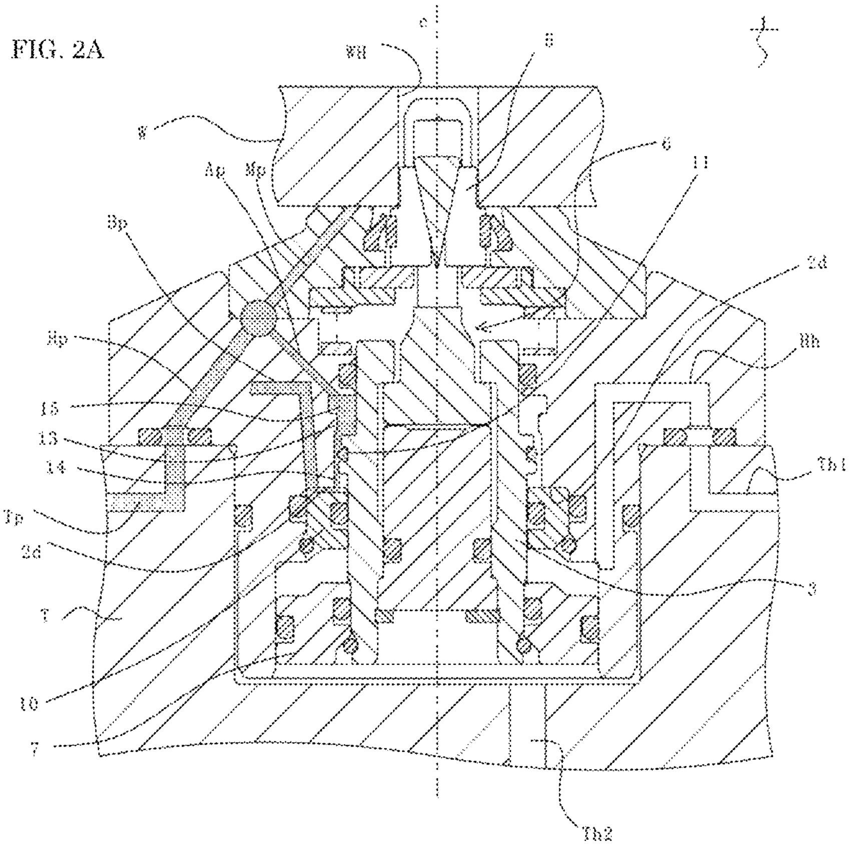
Figure 2B:
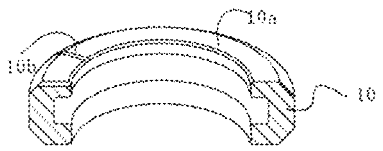

The annular valve member 10 can slide up/down on the outer periphery of the piston rod 3 of the lower side of the push section 12, and a groove 10*b* is provided on the upper surface 10*a* of the annular valve member 10 (see FIG. 2B). The groove 10*b* is provided on a portion of the upper surface 10*a* of the annular valve member 10 in the radial direction of the axis c. When the upper surface 10*a* of the annular valve member 10 and the ring surface 2*d* are in surface contact with each other, a pressure loss passage having a large pressure loss is formed by the groove 10*b* and the ring surface 2*d*. The valve member region 18 communicates with the B passage Bp only through the pressure loss passage due to the groove 10*b* when the upper surface 10*a* of the annular valve member 10 and the ring surface 2*d* are in surface contact with each other. When the annular valve member 10 is lowered, a gap opens between the upper surface 10*a* and the ring surface 2*d* of the annular valve member 10, and the pressure loss passage cannot be maintained.

A mount portion 9 is provided on an upper end side of the housing 2. The mount portion 9 includes a seating surface 9*a* on which a workpiece is loaded, and a guide portion 9*b* that guides a slider piece 5 in the radial direction of the axis c. A packing 9*c* for preventing dust from entering is disposed between the outer periphery of the slider piece 5 and the mount portion 9. On the upper side of the mount portion 9, a cap 9*d* is covered as necessary.

Next, a flow path of a pressure fluid for moving the output member 6 up/down will be described. The pressure fluid on the clamp side is supplied to the upper side of the piston 7 via a flow path Th1 of a table T and a flow path Hh of the housing 2. An upper space of the piston 7 is a clamp chamber CL into which the pressure fluid flows when the cylinder device 1 clamps the workpiece, and is surrounded by the upper surface of the piston 7, the cylinder portion 2*c*, and the lower surface of the annular valve member 10.

When the cylinder device 1 unclamps the workpiece, the pressure fluid is supplied to the lower side of the piston 7 via a flow path Th2 of the table T. An unclamping chamber UC is surrounded by the lower side of the piston 7, the lower surface of the cylinder portion 2*c*, the lower surface of the piston rod 3, and the lower surface of the spacer 8.

A clamp operation of the cylinder device will be described.

The cylinder device 1 showed in FIG. 1A is in an unclamped state. The pressure fluid is discharged from the clamp chamber CL, and the pressure fluid is supplied to the unclamping chamber UC through the flow path Th2. The output member 6 in the unclamped state is in a raised position.

The cylinder device 1 shown in FIG. 2A is in a clamped state. A grip hole WH is bored in the workpiece W. The slider piece 5 is inserted into the grip hole WH. When switching to the clamped state, the pressure fluid is discharged from the unclamp chamber UC through the flow path Th2, and the pressure fluid is supplied to the clamp chamber CL through the flow paths Th1 and Hh. When the output member 6 is lowered, the cam surface 5*a* provided at the end portion of the clamp rod 4 pushes the slider piece 5 in the radial direction of the axis c and grips from the inside of the grip hole WH. When switching from the clamped state to the unclamped state, the pressure fluid in the clamp chamber CL is discharged to supply the pressure fluid to the unclamping chamber UC.

Figure 3:
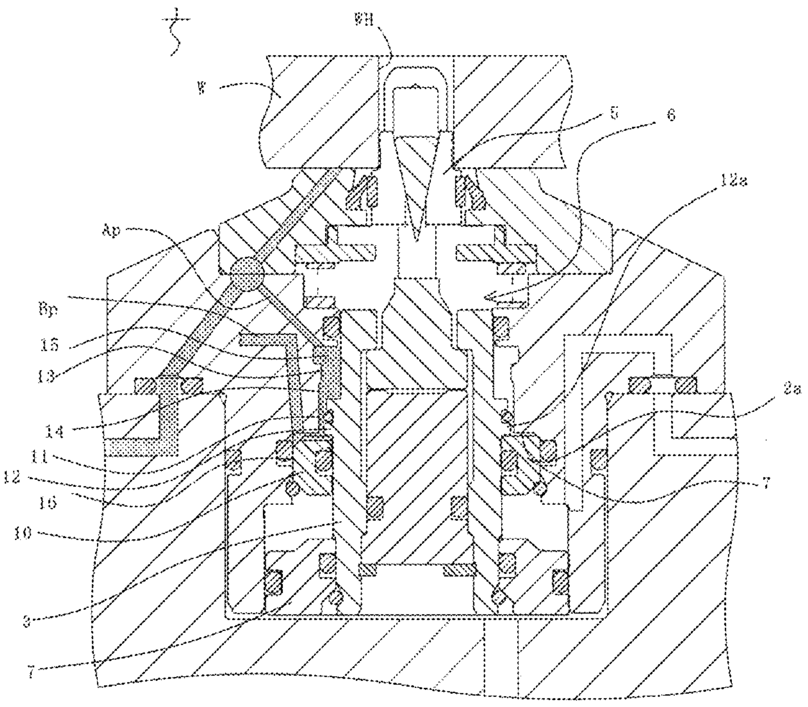
FIG. 3 is a cross-sectional view (overstroke state) of the cylinder device in Example 1.

The cylinder device 1 shown in FIG. 3 is in an overstroke state in which the output member 6 is excessively lowered for some reason. For example, this may occur when the size of the grip hole WH is too large, or when the slider piece 5 is worn down to a small diameter. In such a case, although the cylinder device 1 is in the clamped state, the workpiece W is not actually gripped accurately.

Next, a flow path of the compressed gas for detecting the position of the output member 6 will be described. A passage Tp of the compressed gas from the table T communicates with a flow path Hp of the housing 2, and branches into two of a passage Mp and the A passage Ap to the mount portion 9. The passages to the mount portion 9 are open to the atmosphere. The A passage Ap is connected to an A passage connection region 15 of the pressure detection portion 2*b*.

Detection of the position of the output member 6 using compressed gas will be described. In the drawings, the flow paths through which the compressed gas flows are indicated by light ink.

In FIG. 1A, the compressed gas is released to the atmosphere via the flow path Mp of the mount portion 9. Therefore, when the pressure of the compressed gas is measured at a position where the compressed gas is supplied (not shown), it is in a low-pressure state. When the workpiece W is mounted on the cylinder device 1 of FIG. 1A, the flow path Mp of the mount portion 9 is blocked by the workpiece W as seen in FIG. 2A. On the other hand, the S-seal section 11 is located in the sliding region 13 and performs a sealing function. Therefore, there is no outlet for compressed gas at the end portion of the A passage Ap. According to this, the pressure of the compressed gas in the A passage Ap is maintained. By measuring the pressure at the position where the compressed gas is supplied, high pressure can be detected and it can be determined whether the workpiece W is mounted or not. This state is an unclamped state. If the workpiece W is mounted at an angle, the workpiece W is not in close contact with the seating surface 9*a*, and the compressed gas will leak out. In this case, it can also be determined that the workpiece W is not properly mounted.

In FIG. 2A, when the output member 6 is moved downward by the pressure fluid, the S-seal section 11 is out of the sliding region 13 and the sealing member no longer functions, and the compressed gas is supplied to the loose insertion region 14 and the valve member region 18. The supplied compressed gas is released to the atmosphere from the B passage Bp via the pressure loss passage formed by the groove 10*b* and the ring surface 2*d*. Therefore, when the pressure of the compressed gas is measured from an external compressed gas supply port, although the pressure is not as low as the pressure in the state in FIG. 1A in which no workpiece W is located, it is possible to detect a state in which the pressure is lowered due to the pressure loss passage. By measuring the pressure at the position where the compressed gas is supplied, a medium pressure can be detected, and it can be determined that the cylinder device 1 is in the clamped state in which the workpiece W is clamped.

In FIG. 3, when the output member 6 is further lowered from the position shown in FIG. 2A, the projection 12*a* of the push section 12 on the lower side of the S-seal section 11 abuts on the annular valve member 10 to lower the annular valve member 10. As a result, a gap between the upper surface 10*a* of the annular valve member 10 and the ring surface 2*d* is created. In this condition, the passage of the compressed gas to the B passage Bp is no longer only by way of the pressure loss passage, but is opened to the atmosphere. When the pressure is measured at the position where the compressed gas is supplied, a low pressure can be detected, and it can be determined that the output member 6 of the cylinder device 1 is in an overstroke state where the output member 6 is excessively lowered.

In the present example, the groove 10*b* is provided in the annular valve member 10, and when the annular valve member 10 moves, the groove 10*b* cooperates with the ring surface 2*d* to form a pressure loss passage, and the upper surface 10*a* of the annular valve member 10 and the ring surface 2*d* are separated, thereby creating two cases; one for detecting a medium pressure and one for detecting a low pressure. Adding to this the state of no compressed gas leaking, three states can be detected.

In the present example, the compressed gas in the table T is branched into two, one of which is supplied to the mount portion 9 and the other to the pressure detection portion 2*b*. However, it is also possible to prepare two systems of compressed gas in the table T, and send one to the mount portion 9 and the other to the pressure detection portion 2*b* separately.

According to the present example, since the position of the output member 6 can be detected in three stages by using the outer periphery of the piston rod 3 and the inner wall of the housing 2, the cylinder device 1 can be miniaturized.

Example 2

Figure 4A:
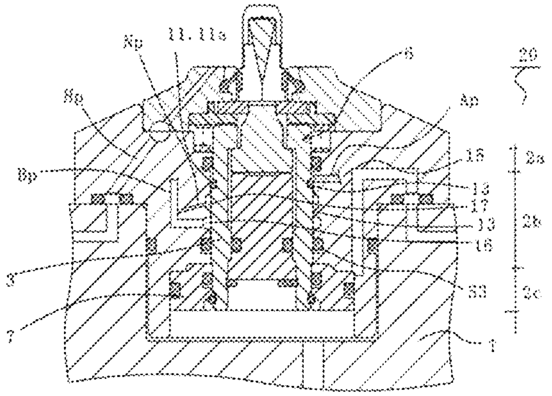
Figure 4B:
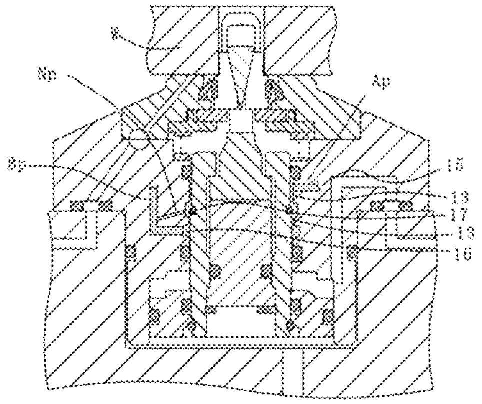
Figure 4C:
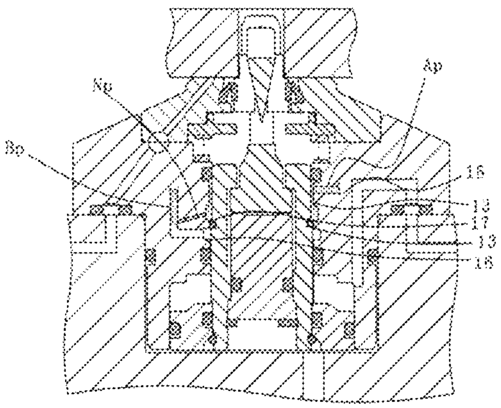

FIGS. 4A to 4C show a cylinder device 20 of Example 2. The cylinder device 20 is a cylinder device that is "high pressure" at the raised position of the output member 6, "low pressure" at the intermediate position, and "medium pressure"at the lowered position.

The difference from Example 1 is the structure of the piston rod 3 of the output member 6 and the pressure detection portion of the housing. The pressure detection portion 2*b* of Example 1 has, from the top, the A passage connection region 15, the sliding region 13, the loose insertion region 14, and the valve member region 18, in that order. However, the pressure detection portion 2*b* of Example 2 has, from the top, the A passage connection region 15, the upper sliding region 13, the pressure loss passage connection region 17, the lower sliding region 13, and the B passage connection region 16, and does not have the valve member region 18. The pressure loss passage connection region 17 is provided with a pressure loss passage Np that communicates with the B passage Bp.

In addition, in Example 2, instead of having the valve member region and the annular valve member 10, the portion corresponding to the annular valve member 10 is part of the housing 2, and the housing 2 and the piston rod 3 are directly sealed by O-ring S3. Therefore, the O-rings S1 and S3 are provided above and below the pressure detection portion 2*b* to prevent the compressed gas from leaking to the atmosphere or the clamp chamber CL. In the outer periphery of the piston rod 3 of Example 2, the push section 12 is not provided, and one S-seal section 11 is provided.

Further, in Example 1, one system of compressed gas in the table T is branched into two, one of which is supplied to the mount portion 9 and the other to the pressure detection portion 2*b*. In Example 2, however, two systems of compressed gas are prepared in the table T, one of which is sent to the mount portion 9 and the other to the A passage Ap. However, in FIGS. 4A to 4C, the passage on the table T side that sends the compressed gas to the A passage Ap is not shown. The above are the differences from the cylinder device 1 in Example 1, and the rest of the configuration is the same, so the description will be omitted.

Next, the operation of the cylinder device 20 will be described. In the unclamped state of FIG. 4A, the seal member 11*a* of the S-seal section 11 of the piston rod 3 is located in the upper sliding region 13. The compressed gas is sealed at this sliding region 13 and cannot leak into the pressure loss passage connection region 17 continuing below. Therefore, by measuring the pressure at the position where the compressed gas is supplied to the A passage Ap, high pressure can be detected.

In the clamped state of FIG. 4B, the output member 6 moves down and comes off the upper sliding region 13. The seal of the S-seal section 11 does not function, and the upper sliding region 13 communicates with the pressure loss passage connection region 17, the lower sliding region 13 and the B passage connection region 16. The pressure loss passage connection region 17 communicates with the B passage Bp via the pressure loss passage Np. In addition, the compressed gas is communicated to the passage connection region 16 via the lower sliding region 13. Therefore, by measuring the pressure at the position where the compressed gas is supplied, low pressure can be detected.

In the clamped state of FIG. 4C, the output member 6 further moves down, and the S-seal section 11 reaches the lower sliding region 13 and exhibits a sealing function.

Therefore, the compressed gas cannot pass through the lower sliding region 13 and only passes through the pressure loss passage connection region 17. Therefore, by measuring the pressure at the position where the compressed gas is supplied, the medium pressure due to the pressure loss passage Np can be detected.

Example 3

Figure 5A:
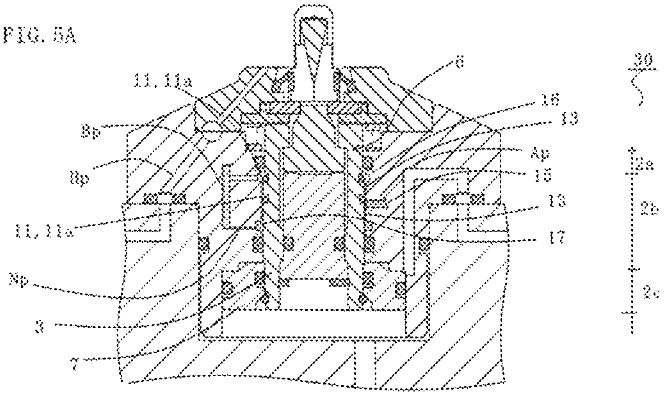
Figure 5B:
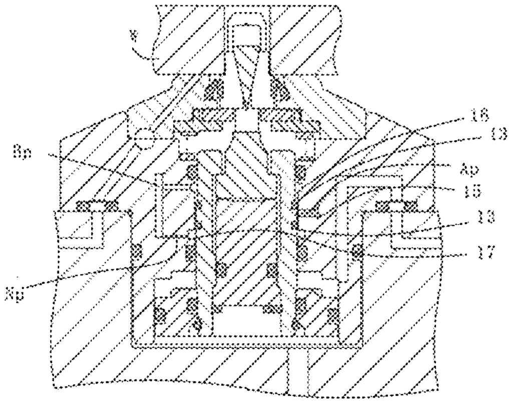
Figure 5C:
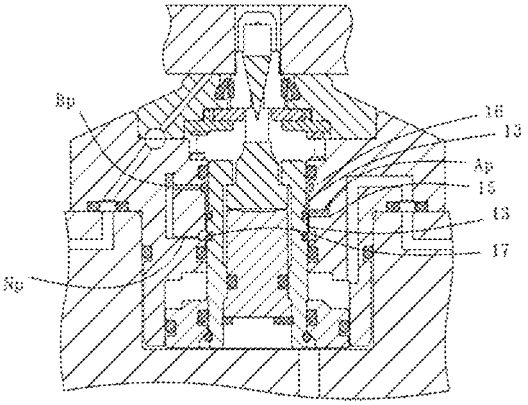

FIGS. 5A to 5C show a cylinder device 30 in Example 3. The cylinder device 30 is a cylinder device that is "medium pressure" at the raised position of the output member 6, "high pressure" at the intermediate position, and "low pressure" at the lowered position.

The difference from Example 1 is the structure of the piston rod 3 of the output member 6 and the pressure detection portion 2*b* of the housing 2. The pressure detection portion 2*b* in Example 3 has, from the top, the B passage connection region 16, the sliding region 13, the A passage connection region 15, the sliding region 13, and the pressure loss passage connection region 17, and unlike Example 1, does not have the valve member region 18, nor the annular valve member 10. Instead, the portion corresponding to the annular valve member 10 is formed as part of the housing 2.

In addition, the piston rod 3 in Example 3 does not have the push section 12 of Example 1 on its outer periphery, but has two S-seal sections 11 on the top and bottom. The interval is determined so that each of the two S-seal sections 11 can simultaneously exhibit a sealing function between the upper and lower sliding regions 13. That is, the A passage connection region 15 is sandwiched between the two S-seal sections 11 that have exerted a sealing function, thereby blocking the compressed gas in the A passage Ap. The above are the differences from the cylinder device 1 in Example 1, and the rest of the configuration is the same, so the description will be omitted.

Next, the operation of the cylinder device 20 will be described.

- In the unclamped state of FIG. 5A, the upper S-seal section 11 is present in the B passage connection region 16, and the lower S-seal section 11 is present in the upper sliding region 13. Therefore, the A passage connection region 15, the lower sliding region 13, and the pressure loss passage connection region 17 are in communication with each other. Therefore, when the pressure is measured at the supply position of the compressed gas, the medium pressure due to the pressure loss passage Np can be detected.

In the clamped state of FIG. 5B, the output member 6 moves down, and the A passage connection region 15 is sandwiched by the two S-seal sections 11, and each of them is present in the upper and lower sliding regions 13. Therefore, by measuring the pressure at the supply port for the compressed gas, high pressure can be detected.

In the clamped state of FIG. 5C, the output member 6 further moves down, and the upper S-seal section 11 is present in the lower sliding region 13. Therefore, the A passage connection region 15, the upper sliding region 13, and the B passage connection region 16 are in communication with each other. Therefore, by measuring the pressure at the supply port of the compressed gas, low pressure can be detected.

Example 4

Figure 6A:
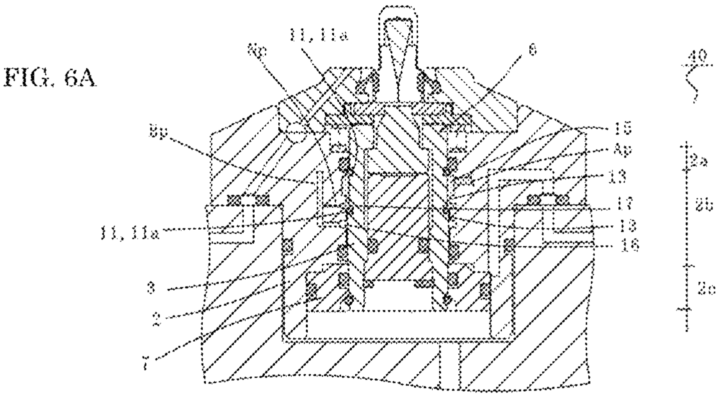
Figure 6B:
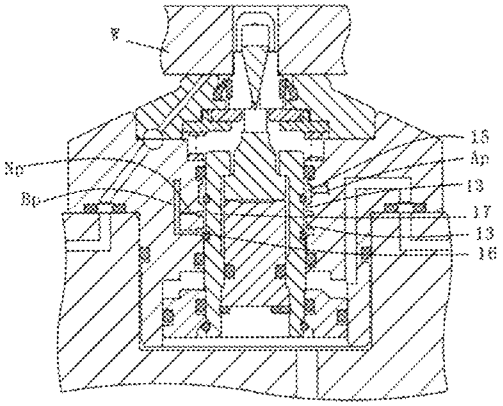
Figure 6C:
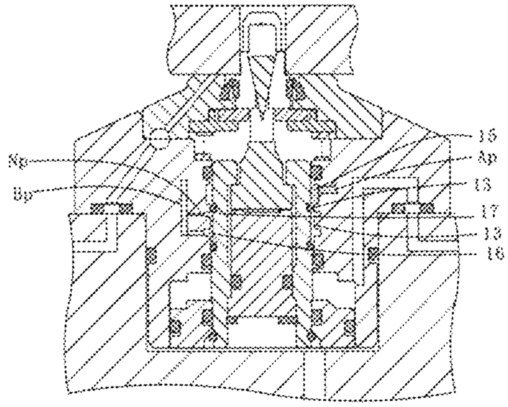

FIGS. 6A to 6C show a cylinder device 40 of Example 4. The cylinder device 40 is a cylinder device that is "medium pressure" at the raised position of the output member 6, "low pressure" at the intermediate position, and "high pressure" at the lowered position.

The difference from Example 1 is the structure of the piston rod 3 of the output member 6 and the pressure detection portion 2*b* of the housing 2. The pressure detection portion 2*b* of Example 4 has, from the top, the A passage connection region 15, the sliding region 13, the pressure loss passage connection region 17, the sliding region 13, and the B passage connection region 16, and unlike Example 1, does not have the valve member region 18, nor the annular valve member 10. Instead, in Example 4, the portion corresponding to the annular valve member 10 is formed as part of the housing 2.

In addition, on the outer periphery of the piston rod 3 of Example 4, the push section 12 of Example 1 is not provided, and two S-seal sections 11 are provided to the top and bottom. The interval is determined so that each of the two S-seal sections 11 can simultaneously exhibit a sealing function between the upper and lower sliding regions 13. The above are the differences from the cylinder device 1 in Example 1, and the rest of the configuration is the same, so the description will be omitted.

In the unclamped state of FIG. 6A, the seal member 11*a* of the lower S-seal section 11 is present in the upper sliding region 13. Therefore, only the B passage connection region 16 is separated from the other region, and the A passage connection region 15, the lower sliding region 13, and the pressure loss passage connection region 17 are in communication with each other. When the pressure is measured at the supply port of the compressed gas, the medium pressure due to the pressure loss passage Np can be detected.

In the clamped state of FIG. 6B, the output member 6 moves down, and the seal member 11*a* of the upper S-seal section 11 is present in the A passage connection region 15, and the seal member 11*a* of the lower S-seal section 11 is present in the B passage connection region 16, respectively. Therefore, the A passage connection region 15, the pressure loss passage connection region 17, and the B passage connection region 16 are in communication with each other. Therefore, by measuring the pressure at the supply port of the compressed gas, low pressure can be detected.

In the clamped state of FIG. 6C, the output member 6 further moves down, and the seal member 11*a* of the upper S-seal section 11 is present in the upper sliding region 13. Only the A passage connection region 15 is separated from other regions. Therefore, by measuring the pressure at the supply port of the compressed gas, high pressure can be detected.

Example 5

Figure 7A:
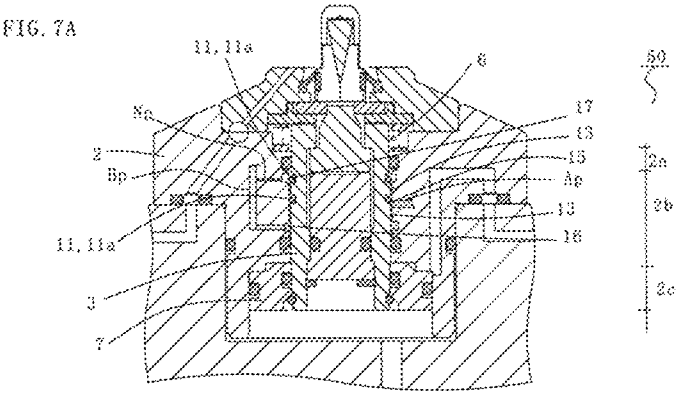
Figure 7B:
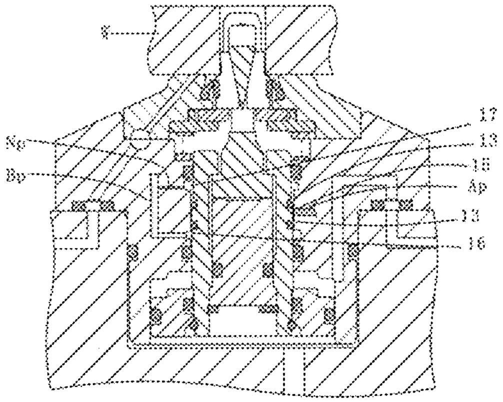
Figure 7C:
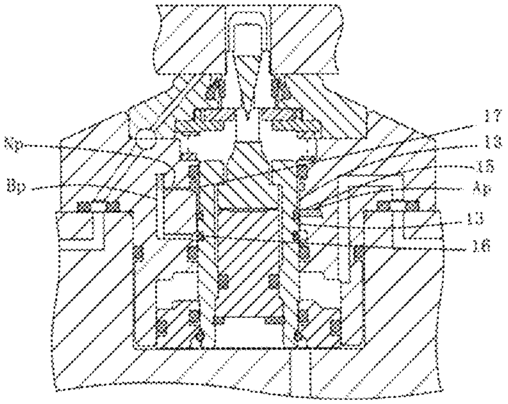

FIGS. 7A to 7C show a cylinder device 50 of Example 5. The cylinder device 50 is a cylinder device that is "low pressure" at the raised position of the output member 6, "high pressure" at the intermediate position, and "medium pressure"at the lowered position.

The difference from Example 1 is the structure of the piston rod 3 of the output member 6 and the pressure detection portion 2*b* of the housing 2. The pressure detection portion 2*b* of Example 5 has, from the top, the pressure loss passage connection region 17, the sliding region 13, the A passage connection region 15, the sliding region 13, and the B passage connection region 16, and unlike Example 1, does not have the valve member region, nor the annular valve member 10. Instead, in Example 5, the portion corresponding to the annular valve member 10 is formed as part of the housing 2.

On the other hand, on the outer periphery of the piston rod 3 of Example 5, the push section 12 of Example 1 is not provided, and two S-seal sections 11 are provided to the top and bottom. The interval is determined so that each of the two S-seal sections 11 can simultaneously exhibit a sealing function between the upper and lower sliding regions 13. That is, the A passage connection region 15 is sandwiched between the two S-seal sections 11 that have exerted a sealing function, thereby blocking the compressed gas in the A passage Ap. The above are the differences from the cylinder device 1 in Example 1, and the rest of the configuration is the same, so the description will be omitted.

Next, the operation of a cylinder device 50 will be described.

In the unclamped state of FIG. 7A, the lower S-seal section 11 is present in the upper sliding region 13. Therefore, the pressure loss passage connection region 17 is separated from the other regions, and the A passage connection region 15, the lower sliding region 13, and the B passage connection region 16 are in communication with each other. Therefore, by measuring the pressure at the supply port of the compressed gas, low pressure can be detected.

In the clamped state of FIG. 7B, the output member 6 moves down, and the A passage connection region 15 is sandwiched between the two S-seal sections 11. The compressed gas cannot be leaked from the A passage connection region 15. Therefore, by measuring the pressure at the supply port of the compressed gas, high pressure can be detected.

In the clamped state of FIG. 7C, the output member 6 further moves down, and the upper S-seal section 11 is present in the lower sliding region 13. Therefore, the A passage connection region 15, the sliding region 13, and the pressure loss passage connection region 17 are in communication with each other. Therefore, when the pressure at the supply port of the compressed gas is measured, the medium pressure due to the pressure loss passage Np can be detected.

Example 6

Figure 8A:
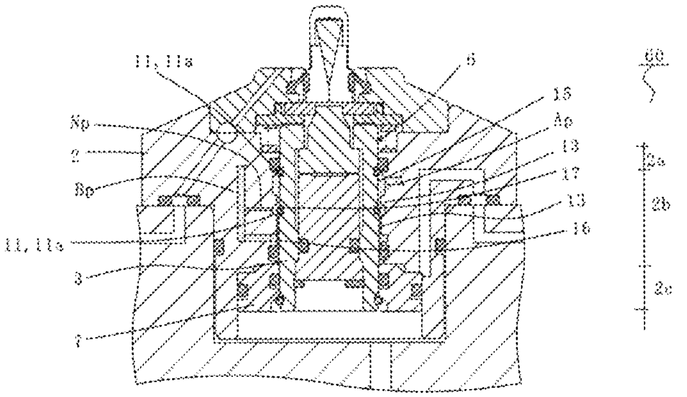
Figure 8B:
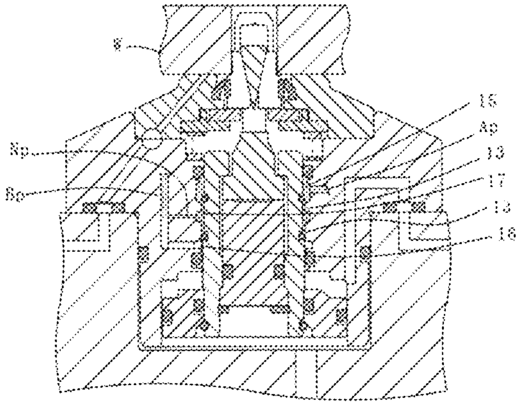
Figure 8C:
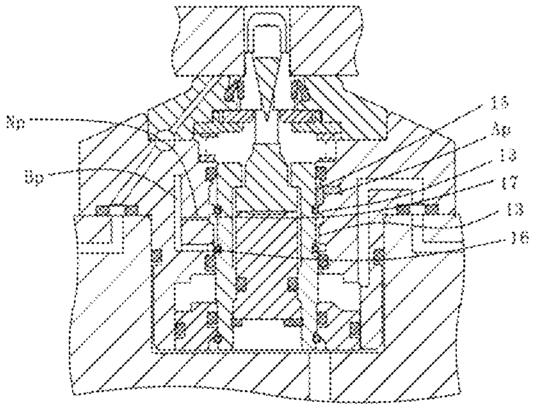

FIGS. 8A to 8C show a cylinder device 60 of Example 6. The cylinder device 60 is a cylinder device that is "low pressure" at the raised position of the output member 6, "medium pressure" at the intermediate position, and "high pressure"at the lowered position.

The difference from Example 1 is the structure of the piston rod 3 of the output member 6 and the pressure detection portion 2*b* of the housing 2. The pressure detection portion 2*b* of Example 6 has, from the top, the A passage connection region 15, the sliding region 13, the pressure loss passage connection region 17, the sliding region 13, and the B passage connection region 16. Unlike Example 1, the valve member region 18 is not included, and the annular valve member 10 is not also included. Instead, in Example 6, the portion corresponding to the annular valve member 10 is formed as part of the housing 2.

On the outer periphery of the piston rod 3 of Example 6, the push section 12 of Example 1 is not provided, and two S-seal sections 11 are provided to the top and bottom. The interval is determined so that each of the two S-seal sections 11 can simultaneously exhibit a sealing function between the upper and lower sliding regions 13. The above are the differences from the cylinder device 1 in Example 1, and the rest of the configuration is the same, so the description will be omitted.

In the unclamped state of FIG. 8A, the seal member 11*a* of the upper S-seal section 11 is present in the A passage connection region 15, and the seal member 11*a* of the lower S-seal section 11 is present in the pressure loss passage connection region 17. Therefore, the A passage connection region 15, the sliding region 13, and the B passage connection region 16 are in communication with each other. Therefore, by measuring the pressure at the supply port of the compressed gas, low pressure can be detected.

In the clamped state of FIG. 8B, the output member 6 moves down, and the seal member 11*a* of the lower S-seal section 11 is present in the lower sliding region 13. The seal member 11*a* of the upper S-seal section 11 is present in the A passage connection region 15. Therefore, only the B passage connection region 16 is separated from the other region, and when the pressure at the supply port of the compressed gas is measured, the medium pressure due to the pressure loss passage Np can be detected.

In the clamped state of FIG. 8C, the output member 6 further moves down, and the seal member 11*a* of the upper S-seal section 11 is present in the upper sliding region 13. The A passage connection region 15 is separated from the other region. Therefore, by measuring the pressure at the supply port of the compressed gas, high pressure can be detected.

Unlike Example 1, in Example 6, the valve member region 18 is not included, and the annular valve member 10 is not also included. It is also possible to achieve the states of "high pressure" at the raised position in Example 1, "medium pressure" at the intermediate position, and "low pressure" at the lowered position without utilizing the valve member region 18 and the annular valve member 10.

Example 7

Example 7 is achieved without utilizing the valve member region 18 and the annular valve member 10. In this case, the pressure detection portion 2*b* has, from the top, the A passage connection region 15, the sliding region 13, the pressure loss passage connection region 17, the sliding region 13, and the B passage connection region 16. One S-seal section 11 is provided on the outer periphery of the piston rod 3.

In the unclamped state, the S-seal section 11 is located in the upper sliding region 13, and high pressure can be detected by separating only the A passage connection region 15 from the other regions.

Next, when the output member moves down, the S-seal section 11 is present in the lower sliding region 13, and the A passage connection region 15, the upper sliding region 13, and the pressure loss passage connection region 17 are communicated with each other. According to this, the medium pressure due to the pressure loss passage Np can be detected.

When the output member 6 further moves down, the S-seal section 11 is located at the B passage connection region 16. The passage connection region 15, the upper sliding region 13, the pressure loss passage connection region 17, the lower sliding region 13, and the B passage connection region 16 are in communication with each other. Therefore, by measuring the pressure at the supply port of the compressed gas, low pressure can be detected.

In this way, the cost of the cylinder device can be reduced because the valve member region 18 and the annular valve member 10 are not used.

According to Examples 2 to 7, the housing 2 is provided with a supply passage (A passage Ap) for supplying compressed gas to the inside of the position detection portion 2*b* (the hollow inner wall of the housing 2), a discharge passage (B passage Bp) for discharging the compressed gas supplied to the inside of the position detection portion 2*b* to the atmosphere, and a pressure loss passage Np for allowing the compressed gas supplied to the inside of the position detection portion 2*b* to pass through with a larger pressure loss than the supply passage (A passage Ap) and the discharge passage (B passage Bp) and being communicated to the discharge passage (B passage Bp). Then, the position detection portion 2*b* is provided with a sliding region 13 having an inner diameter that allows the sealing member 11*a* to come in contact so that the sealing function acts effectively, and a loose insertion region 14 having a large inner diameter such that the sealing function of the sealing member 11*a* does not work at all.

In these examples (i.e., Examples 2 to 7), the loose insertion region 14 is part of the A passage connection region 15, the B passage connection region 16, and the pressure loss passage connection region 17, so that one loose insertion region 14 that is a part of pressure loss passage connection region 17 is sandwiched between the two sliding regions 13 from the top and the bottom, and further, these two sliding regions 13 are sandwiched between two loose insertion regions 14 from the top by loose insertion region 14 that is part of A passage connection region 17 and the bottom by loose insertion region 14 that is part of the B passage connection region 16, respectively.

Example 2 and Example 7 are an example (hereinafter referred to as type 1) in which one seal member 11*a* is provided on the piston rod 3. Example 3 and Example 5 are a first example (hereinafter referred to as type 2) in which two seal members 11*a* are provided on the piston rod 3. Example 4 and Example 6 are a second example (hereinafter referred to as type 3) in which two seal members 11*a* are provided on the piston rod 3.

In the example of the type 2, the upper and lower seal members 11*a* are located such that they are simultaneously at the positions of the upper and lower sliding regions 13 respectively.

In the example of the type 3, when one seal member 11*a* is located at the position of any of the upper and lower sliding regions 13 in a process in which the piston rod 3 is moved up/down, the other seal member 11*a* is attached so as to be located at a position of any loose insertion region 14 (the A passage connection region 15, the B passage connection region 16, and the pressure loss passage connection region 17).

In any of types 1 to 3, the A passage connection region 15 and the pressure loss passage connection region 17 are adjacent to each other. Then, when one (type 1) or two (types 2, 3) seal member 11*a* cooperate with either the upper or lower sliding region 13 or the upper and lower sliding regions 13 to exert a sealing function and isolate the A passage connecting region 15 from the other passages, the detected pressure of the compressed gas becomes "high pressure". Further, when one seal member 11*a* cooperates with either the upper or lower sliding surface area 13 to exert a sealing function and isolate the B passage connection region 16 while the A passage connection region 15 and the pressure loss passage connection region 17 are in communication with each other, the detected pressure of the compressed gas becomes "medium pressure." When one seal member 11*a* cooperates with either the upper or lower sliding surface area 13 to exert a sealing function and isolate the pressure loss passage connection region 17 while the A passage connection region 15 and the B passage connection region 16 are in communication with each other, or when the upper and lower seal members 11*a* do not cooperate with either the upper or lower sliding region 13 and do not exert a sealing function, the detected pressure of the compressed gas becomes "low pressure".

When the A passage connection region 15 is a supply passage for supplying compressed gas, the A passage connection region 15, the B passage connection region 16 and the pressure loss passage connection region 17 may be arranged vertically in any order, as long as the A passage connection region 15 and the pressure loss passage connection region 17 are adjacent to each other. When the B passage connection region 16 is a supply passage for supplying the compressed gas, the A passage connection region 15, the B passage connection region 16 and the pressure loss passage connection region 17 may be arranged vertically in any order, as long as the B passage connection region 16 and the pressure loss passage connection region 17 are adjacent to each other. In addition, whether the position where the seal member 11*a* is present in the sliding region 13 is the upper or lower end position, or the position where the seal member 11*a* is present in the loose insertion region 14 (either the A passage connection region 15, the B passage connection region 16, or the pressure loss passage connection region 17) is the upper or lower end position can be selected so that the three conditions of "high pressure", "medium pressure", and "low pressure" can be detected. For example, in Example 4 and Example 6, the A passage connection region 15, the B passage connection region 16, and the pressure loss passage connection region 17 are arranged in the same vertical position. However, in Example 4, the lower seal member 11*a* has the lower sliding region 13 as an upper limit position, whereas in Example 6, the lower seal member 11*a* has the loose insertion region 14 (pressure loss passage connection region 17) as an upper limit position. Therefore, the order in which the three conditions of "high pressure", "medium pressure", and "low pressure" occur in relation to the position of the piston rod 3 is different.

In the above examples, the pressure loss passage connection region 17 is shown to communicate only with the B passage Bp via the pressure loss passage Np, but it may also communicate with the A passage Ap. Although the A passage Ap is described as a supply passage and the B passage Bp as a discharge passage, the A passage Ap may be a discharge passage and the B passage Bp may be a supply passage. As the pressure fluid for moving the output member 6 up/down, a liquid such as hydraulic pressure or water, or a gas such as air or nitrogen can be used.

DESCRIPTION OF SYMBOLS

1, 20, 30, 40, 50, 60 cylinder device
2 housing
2*a* color portion
2*b* pressure detection portion
2*c* cylinder portion
2*d* ring surface
3 piston rod
3*a* flange portion
4 clamp rod
4*a* cam portion

4*b* inclined surface
5 slider piece
5*a* cam surface
6 output member
7 piston
8 spacer
8*a* stop ring
9 mount portion
9*a* seating surface
9*b* guide portion
9*c* packing
9*d* cap
10 annular valve member
10*a* upper surface
10*b* groove
11 S-seal section
11*a* seal member
11*b* ring groove
12 push section
12*a* projection
13 sliding region
14 loose insertion region
15 A passage connection region
16 B passage connection region
17 pressure loss passage connection region
18 valve member region

The invention claimed is:

1. A cylinder device having a piston that moves up/down in a housing with a pressure fluid, said cylinder device comprising:

a piston rod fixed to the piston;

a seal member attached to a seal groove on an outer peripheral wall of the piston rod; and a hollow inner wall in the housing in which the piston rod is configured to move up/down, said housing having:

a supply passage for supplying a compressed gas inside the hollow inner wall;

a discharge passage for discharging the compressed gas supplied inside the hollow inner wall to atmosphere; and a pressure loss passage for allowing the compressed gas supplied inside the hollow inner wall to pass through, with a pressure loss larger than that of a pressure loss of the compressed gas passing through each of the supply passage and the discharge passage, and the pressure loss passage being in communication with the discharge passage, said hollow inner wall in the housing having:

a first sliding region and a second sliding region each having an inner diameter such that when the piston rod has been moved to cause the seal member to make contact with a corresponding sliding region, a seal function of the seal member is enabled; and a plurality of loose insertion regions each having a larger inner diameter than the inner diameter of the first sliding region and the second sliding region so that the seal function of the seal member is disabled when the seal member is in a corresponding loose insertion region, wherein the plurality of loose insertion regions includes a first loose insertion region sandwiched between the first sliding region and the second sliding region from a top and a bottom of the first loose insertion region, and the first sliding region and the second sliding region are disposed so as to be sandwiched between a second loose insertion region and a third loose insertion region of the plurality of loose insertion regions from a top of the first sliding region and a bottom of the second sliding region, wherein each of the supply passage, the discharge passage, and the pressure loss passage is connected to a different one of the plurality of loose insertion regions, and a loose insertion region to which either the supply passage or the discharge passage is connected is vertically adjacent to another loose insertion region to which the pressure loss passage is connected.

2. A cylinder device having a piston that moves up/down in a housing with a pressure fluid, said cylinder device comprising:

a piston rod fixed to the piston;

an upper seal member and a lower seal member each attached to an upper seal groove and a lower seal groove, respectively, the upper seal groove and the lower seal groove each being formed on an outer peripheral wall of the piston rod; and a hollow inner wall in the housing in which the piston rod is configured to move up/down, said housing having:

a supply passage for supplying a compressed gas inside the hollow inner wall;

a discharge passage for discharging the compressed gas supplied inside the hollow inner wall to atmosphere; and a pressure loss passage for allowing the compressed gas supplied inside the hollow inner wall to pass through, with a pressure loss larger than a pressure loss of the compressed gas passing through each of the supply passage and the discharge passage, and the pressure loss passage being in communication with the discharge passage, said hollow inner wall in the housing having:

a first sliding region and a second sliding region each having an inner diameter such that when the piston rod has been moved to cause a corresponding seal member to make contact with a corresponding sliding region, a seal function of the corresponding seal member is enabled; and a plurality of loose insertion regions each having a larger inner diameter than the inner diameter of the first sliding region and the second sliding region so that the seal function of a corresponding seal member is disabled when the corresponding seal member is in a corresponding loose insertion region, wherein the plurality of loose insertion regions includes a first loose insertion region sandwiched between the first sliding region and the second sliding region from a top and a bottom of the first loose insertion region, and the first sliding region and the second sliding region are disposed so as to be sandwiched between a second loose insertion region and a third loose insertion region of the plurality of loose insertion regions from a top of the second sliding region and a bottom of the first sliding region, wherein each of the supply passage, the discharge passage, and the pressure loss passage is connected to a different one of the plurality of loose insertion regions, and a loose insertion region to which either the supply passage or the discharge passage is connected is vertically adjacent to another loose insertion region to which the pressure loss passage is connected, and wherein the upper seal member and lower seal member are attached in such a way that the upper seal member is positioned in the second sliding region at the same time the lower seal member is positioned in the first sliding region when the piston rod is disposed in at least one position in the housing.

3. A cylinder device having a piston that moves up/down in a housing with a pressure fluid, said cylinder device comprising:

a piston rod fixed to the piston;

an upper seal member and a lower seal member each attached to an upper seal groove and a lower seal groove, respectively, the upper seal groove and the lower seal groove being formed on an outer peripheral wall of the piston rod; and a hollow inner wall in the housing in which the piston rod is configured to move up/down, said housing having:

a supply passage for supplying a compressed gas inside the hollow inner wall;

a discharge passage for discharging the compressed gas supplied inside the hollow inner wall to atmosphere; and a pressure loss passage for allowing the compressed gas supplied inside the hollow inner wall to pass through, with a pressure loss larger than that of a pressure loss of the compressed gas passing through each of the supply passage and the discharge passage, and the pressure loss passage being in communication with the discharge passage, said hollow inner wall in the housing having:

an upper sliding region and a lower sliding region each having an inner diameter such that when the piston rod has been moved to cause a corresponding seal member to make contact with a corresponding sliding region, a seal function of the corresponding seal member is enabled; and a plurality of loose insertion regions each having a larger inner diameter than the first sliding region and the second sliding region so that the seal function of a corresponding seal member is disabled when the corresponding seal member is in a corresponding loose insertion region, wherein the plurality of loose insertion regions include a first loose insertion region sandwiched between the upper sliding region and the lower sliding region from a top and a bottom of the first loose insertion region, and the upper sliding region and the lower sliding region are disposed so as to be sandwiched between a second loose insertion region and a third loose insertion region of the plurality of loose insertion regions from a top of the lower sliding region and a bottom of the upper sliding region, wherein each of the supply passage, the discharge passage, and the pressure loss passage is connected to a different one of the plurality of loose insertion regions, and a loose insertion region to which either the supply passage or the discharge passage is connected is vertically adjacent to another loose insertion region to which the pressure loss passage is connected, and wherein when the piston rod is in a first position, one of the upper seal member and lower seal member is positioned at a position of either the upper sliding region or the lower sliding region and the other seal member of the upper seal member and the lower seal member is positioned at a position of one of the plurality of loose insertion regions.

4. A cylinder device having a piston that moves up/down in a housing with a pressure fluid, said cylinder device comprising:

a piston rod fixed to the piston;

a seal member attached to a seal groove on an outer peripheral wall of the piston rod;

a hollow inner wall in the housing in which the piston rod is configured to move up/down; and an annular valve member externally connected to the piston rod, wherein the housing is provided with a supply passage for supplying a compressed gas inside the hollow inner wall and a discharge passage for discharging the compressed gas supplied inside the hollow inner wall to atmosphere, wherein a projection configured to push down the annular valve member is provided below the seal groove, a sliding region having an inner diameter such that when the seal member makes contact with the sliding region a seal function of the seal member is enabled, a loose insertion region having a larger inner diameter than the sliding region such that the seal function of the seal member is disabled when the seal member is in the loose insertion region, and a valve member region having an inner diameter in which the annular valve member can move up/down and the valve member region stores the annular valve member while an upper side of the annular valve member is surrounded by a ring surface, the valve member region being in continuous vertical communication with the discharge passage, and wherein, the cylinder device is configured so that when the piston rod is moved up/down, the seal member is provided at a first position in the sliding region, the seal member is provided at a second position in the loose insertion region, and the projection is provided at a position where the annular valve member is pushed down.

* * * * *